(12) United States Patent
Karasawa

(10) Patent No.: US 8,194,267 B2
(45) Date of Patent: Jun. 5, 2012

(54) IMAGE FORMING APPARATUS AND METHOD OF THE SAME

(75) Inventor: Masayoshi Karasawa, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/102,205

(22) Filed: May 6, 2011

(65) Prior Publication Data

US 2011/0205575 A1    Aug. 25, 2011

Related U.S. Application Data

(63) Continuation of application No. 11/688,534, filed on Mar. 20, 2007, now Pat. No. 7,961,338.

(51) Int. Cl.
*G06F 15/00* (2006.01)
*G03G 15/00* (2006.01)

(52) U.S. Cl. .......................... 358/1.14; 399/21

(58) Field of Classification Search ................ 358/1.14, 358/1.15, 1.13, 1.16, 1.18, 3.13, 450, 437, 358/404, 269; 347/16, 19, 104; 271/20, 271/171, 103, 106, 240, 184, 225, 188; 399/31, 399/43, 38, 81, 9, 21, 382; 355/40, 51, 57, 355/23

See application file for complete search history.

(56) References Cited

U.S. PATENT DOCUMENTS

| | | | |
|---|---|---|---|
| 5,745,661 A * | 4/1998 | Koh et al. | 358/1.14 |
| 7,961,338 B2 * | 6/2011 | Karasawa | 358/1.14 |
| 2007/0147855 A1 | 6/2007 | Shimada | |

FOREIGN PATENT DOCUMENTS

| | | |
|---|---|---|
| JP | 08-216484 | 8/1996 |
| JP | 2000-326570 | 11/2000 |
| JP | 2002-234238 | 8/2002 |
| JP | 2005-297294 | 10/2005 |
| JP | 2006-208739 | 8/2006 |
| JP | 2006-272904 | 10/2006 |

OTHER PUBLICATIONS

U.S. Office Action for U.S. Appl. No. 11/688,534 mailed on Aug. 25, 2010.

Japanese Office Action for Japanese Application No. 2008-066088 mailed on Apr. 10, 2012.

* cited by examiner

*Primary Examiner* — Saeid Ebrahimi Dehkordy
(74) *Attorney, Agent, or Firm* — Turocy & Watson, LLP

(57) ABSTRACT

When a sheet P is jammed after start of a print job, it is determined whether an automatic resumption mode for automatically resuming the print job is set. When a determination result of this determination is affirmative, the print job is resumed after the jam is released. When the determination result is negative, the print job is stopped.

18 Claims, 5 Drawing Sheets

IMAGE FORMING APPARATUS AND METHOD OF THE SAME

CROSS-REFERENCE TO RELATED APPLICATIONS

This application is a Continuation of application Ser. No. 11/688,534 filed Mar. 20, 2007, the entire contents of which are hereby incorporated herein by reference.

BACKGROUND OF THE INVENTION

1. Field of the Invention

The present invention relates to an image forming apparatus that prints an image on a sheet and a control method of the image forming apparatus.

2. Description of the Related Art

An image forming apparatus forms an electrostatic latent image corresponding to an image scanned from an original or an image inputted from the outside on a surface of a photoconductive drum, develops the electrostatic latent image with a developing agent to visualize the image, and transfers the visible image onto a sheet. Sheets are stored in a cassette, taken out one by one, and conveyed to the photoconductive drum. The sheet having the visible image transferred thereon is conveyed to a fixing unit. The fixing unit fixes the visible image transferred on the sheet with heat. This sheet subjected to the fixing is discharged to the outside of a main body. In this way, the image on the original or the image inputted from the outside is printed on the sheet.

During execution of such print, a sheet being conveyed may be jammed. When a jam occurs, naturally, the print is suspended. When the jam of the sheet is released by a user, the print is resumed automatically.

However, since a fundamental cause of the jam is not solved, for example, when a cause of the jam is a mechanical failure, even if the jam is released by the user, a jam occurs again. When jams are repeated in this way, several sheets and the developing agent are wasted.

BRIEF SUMMARY OF THE INVENTION

It is an object of an aspect of the invention to provide an image forming apparatus that can prevent a situation in which sheets are repeatedly jammed and a control method of the image forming apparatus.

An image forming apparatus according to an aspect of the invention includes: a first control section that starts, when a print job for printing an image on a sheet occurs, the print job; and a second control section that determines, when the sheet is jammed after the start of the print job, whether an automatic resumption mode for automatically resuming the print job is set, resumes, when a determination result of this determination is affirmative, the print job after the jam is released, and stops the print job when the determination result is negative.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the invention will be hereinafter explained with reference to the drawings.

Figure 1:
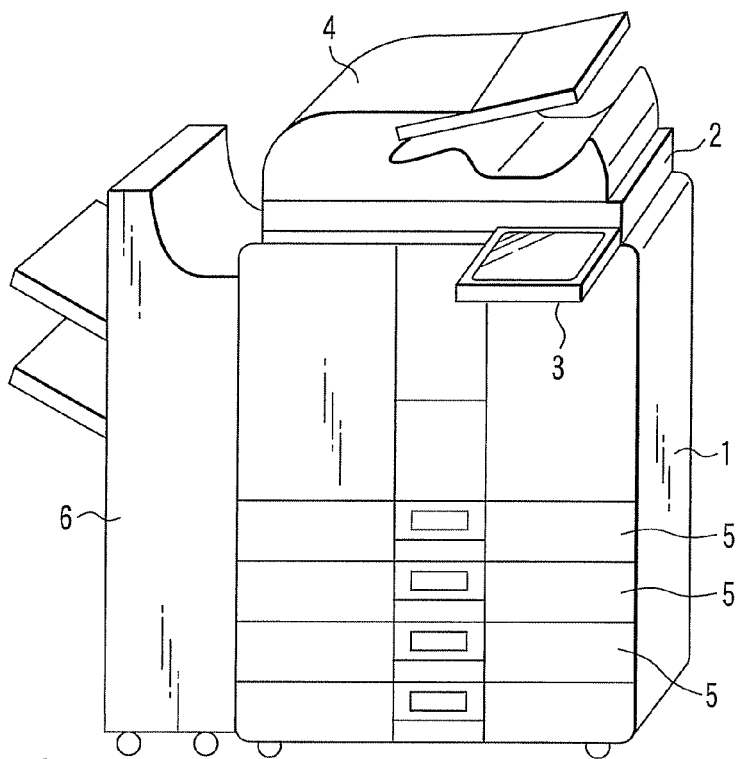
FIG. 1 is a perspective view showing an external appearance of an embodiment.
Figure 2:
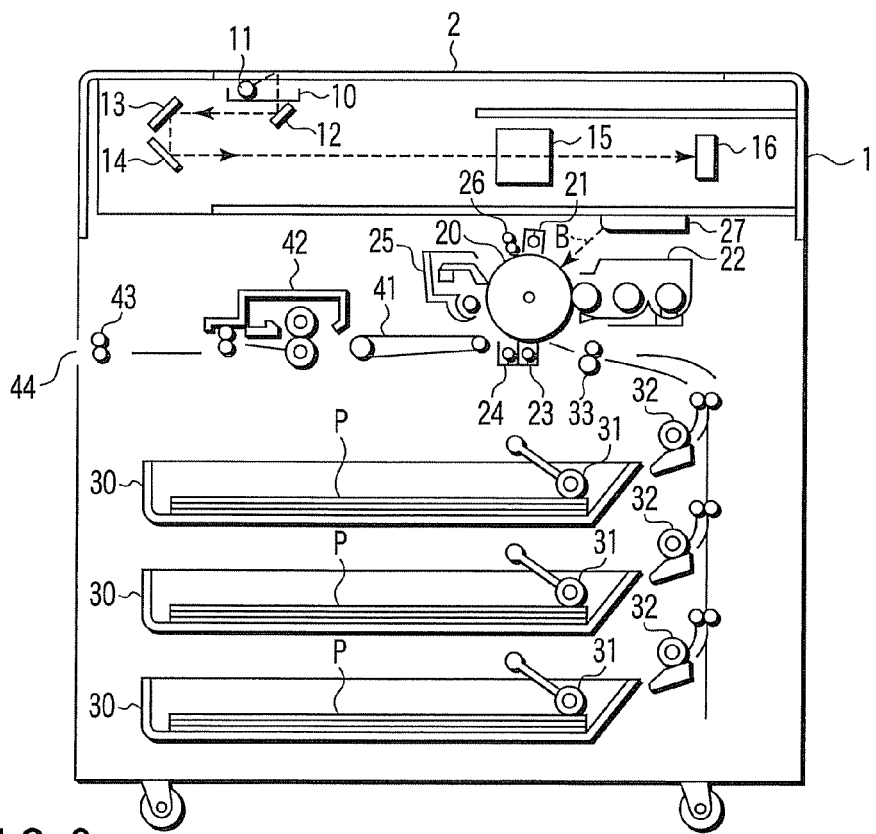
FIG. 2 is a diagram showing a structure of the inside of a main body of the embodiment.

As shown in FIGS. 1 and 2, an original stand 2 and a control panel 3 are provided in an upper part of a main body 1 of an image forming apparatus. An automatic document feeder (ADF) 4 is provided on the original stand 2 to be opened and closed freely.

A carriage 10 is provided on a lower surface side of the original stand 2. An exposure lamp 11 is provided in the carriage 10. The carriage 10 can reciprocatingly move along the lower surface of the original stand 2. The exposure lamp 11 is lit while the carriage 10 is reciprocatingly moving, whereby an original set on the original stand 2 is exposed to light.

According to this exposure, a reflected light image of the original set on the original stand 2 is obtained. The reflected light image is projected on a CCD (Charge Coupled Device) 16 by reflecting mirrors 12, 13, and 14 and a lens block 15. The CCD 16 outputs a signal of a voltage level corresponding to a light reception amount.

A scanner that optically scans the original set on the original stand 2 is constituted by the carriage 10, the exposure lamp 11, the reflecting mirrors 12, 13, and 14, the lens block 15, the CCD 16, and the like.

After an image signal outputted from the CCD 10 is amplified and subjected to image processing, the image signal is supplied to a laser unit 27. The laser unit 27 emits a laser beam B corresponding to the input signal.

A photoconductive drum 20 is provided to rotate freely in substantially the center in the main body 1. A charging unit 21, a developing unit 22, a transferring unit 23, a peeling unit 24, a cleaner 25, and a charge removing unit 26 are disposed in order around this photoconductive drum 20. The laser beam B emitted from the laser unit 27 is irradiated on the surface of the photoconductive drum 20.

Plural cassettes 30 are provided at the bottom in the main body 1. A large number of sheets P of sizes different from one another are stored in these cassettes 30. The sheets P are taken out one by one from any one of these cassettes 30. As a roller for taking out the sheets P, a pickup roller 31 is provided in each of the cassettes 30. The sheets P taken out are separated from the cassette 30 by a separation roller 32, respectively, and sent to registration rollers 33. The registration rollers 33 deliver the sheet P to a space between the photoconductive drum 20 and the transferring unit 23 at timing set taking into account rotation of the photoconductive drum 20.

The charging unit 21 applies a high voltage to the photoconductive drum 20 to charge the surface of the photoconductive drum 20 with electrostatic charges. The laser beam B emitted from the laser unit 27 is irradiated on the surface of the photoconductive drum 20 subjected to this charging. An electrostatic latent image corresponding to the image scanned by the scanner is formed on the surface of the photoconductive drum 20 by this irradiation.

The electrostatic latent image formed on the photoconductive drum 20 is visualized by a developing agent (a toner) supplied from the developing unit 22. This visible image is transferred onto the sheet P by the transferring unit 23. The sheet P subjected to the transfer is peeled from the photoconductive drum 20 by the peeling unit 24. The developing agent and the charges remain on the surface of the photoconductive drum 20 from which the sheet P is peeled. The remaining developing agent is removed by the cleaner 25. The remaining charges are removed by the chare removing unit 28.

The sheet P peeled from the photoconductive drum 20 is sent to a fixing unit 42 by a conveyor belt 41. The fixing unit 42 fixes the visible image transferred onto the sheet P with heat. The sheet P subjected to the fixing is discharged to the sheet discharging unit 6 through a discharge port 44 by a sheet discharging roller 43.

A printer that prints the image scanned by the scanner on the sheet P is constituted by the structure from the photoconductive drum 20 to the discharge port 44.

Figure 3:
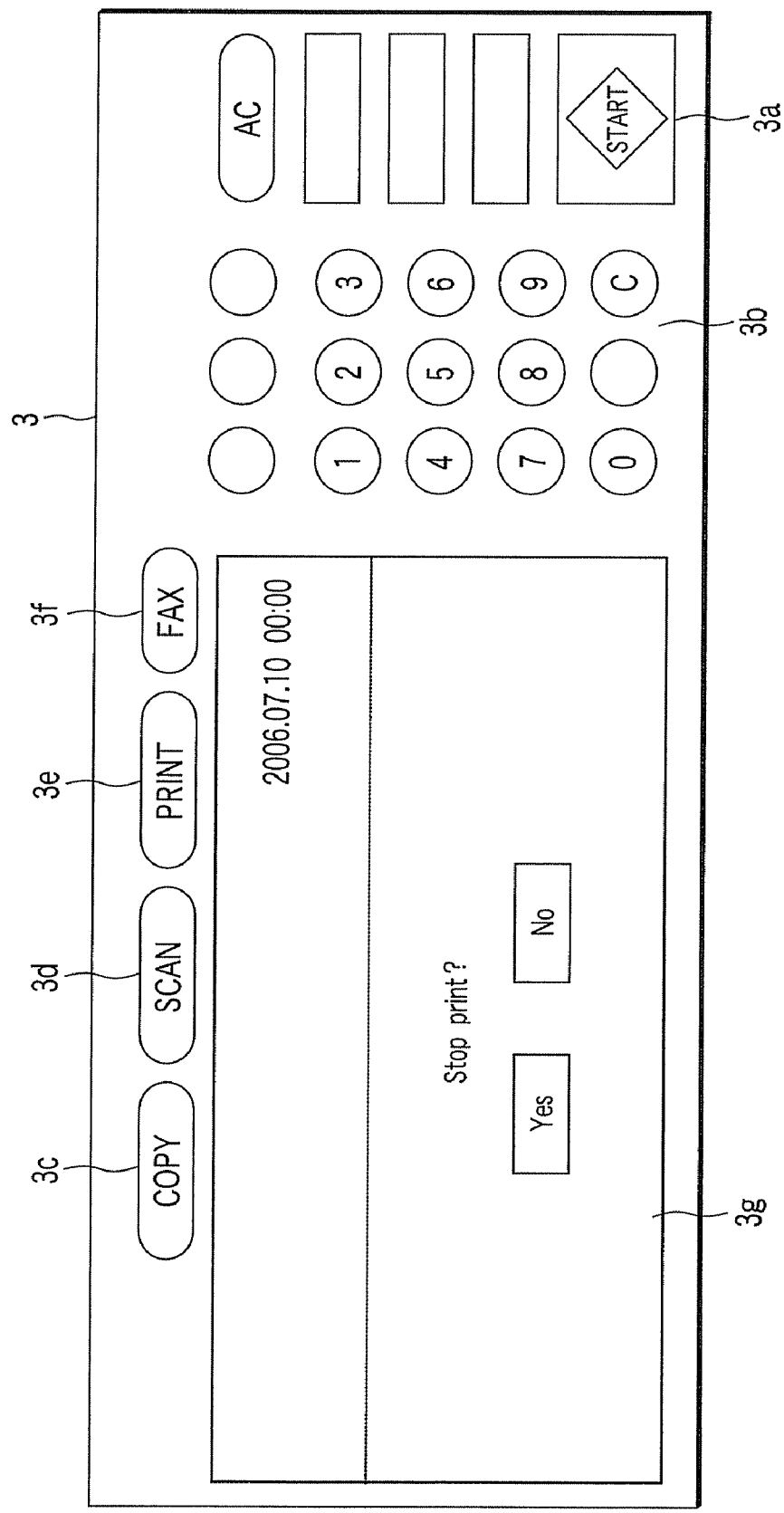
FIG. 3 is a diagram showing a structure and an example of display of a control panel of the embodiment.

As shown in FIG. 3, the control panel 3 has a start key 3a, a ten key pad 3b, a copy key 3c, a scan key 3d, a print key 3e, and a facsimile key 3f and also has a liquid crystal screen 3g of a touch panel type as a display section.

Figure 4:
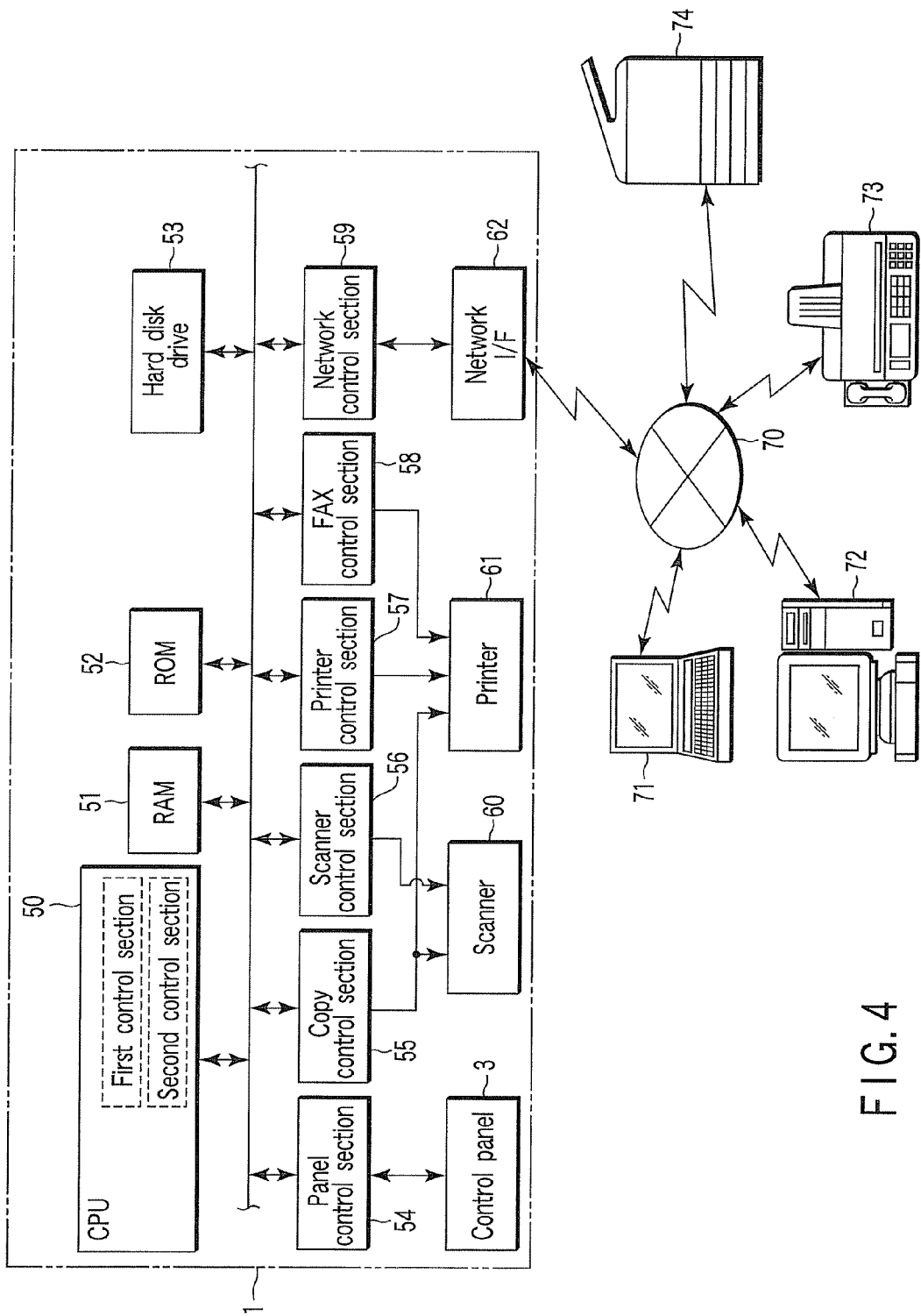
FIG. 4 is a block diagram of a control circuit of the embodiment.

An overall control circuit is shown in FIG. 4.

A RAM 51, a ROM 52, a hard disk drive 53, a panel control unit 54, a copy control unit 55, a scanner control unit 56, a printer control unit 57, a facsimile (FAX) control unit 58, and a network control unit 59 are connected to a CPU 50.

The RAM 51 is a memory for storage of various data. Various controls programs necessary for operations of the main body 1 are stored in the ROM 52. Image data scanned in the main body 1, image data transferred from an external apparatus, and the like are stored in the hard disk drive 53.

The panel control unit 54 controls the control panel 3. The copy control unit 55 controls a normal copy function employing a scanner 60 and a printer 61. The scanner control unit 56 controls a scan function employing the scanner 60 (a scan-to-box function, a scan-to-file function, and a scan-to-E-mail function). The printer control unit 57 controls a network print function employing the printer 61. The facsimile control unit 58 controls a facsimile function employing the printer 61.

The network control unit 59 controls data transmission and reception between the main body 1 and the external apparatus via a network interface 62. The network interface 62 includes a LAN board, a FAX mode, and the like and is connected to personal computers 71 and 72, a facsimile apparatus 73, another image forming apparatus 74, and the like as external apparatuses via an external communication line 70.

The CPU 50 includes a first control section and a second control section. The first control section starts, when a print job for printing an image on the sheet P occurs, the print job. The second section determines, when the sheet P is jammed after the start of the print job, whether an automatic resumption mode for automatically resuming the print job is set, resumes, when a determination result of this determination is affirmative, the print job after the jam is released, and stops the print job when the determination result is negative.

Figure 5:
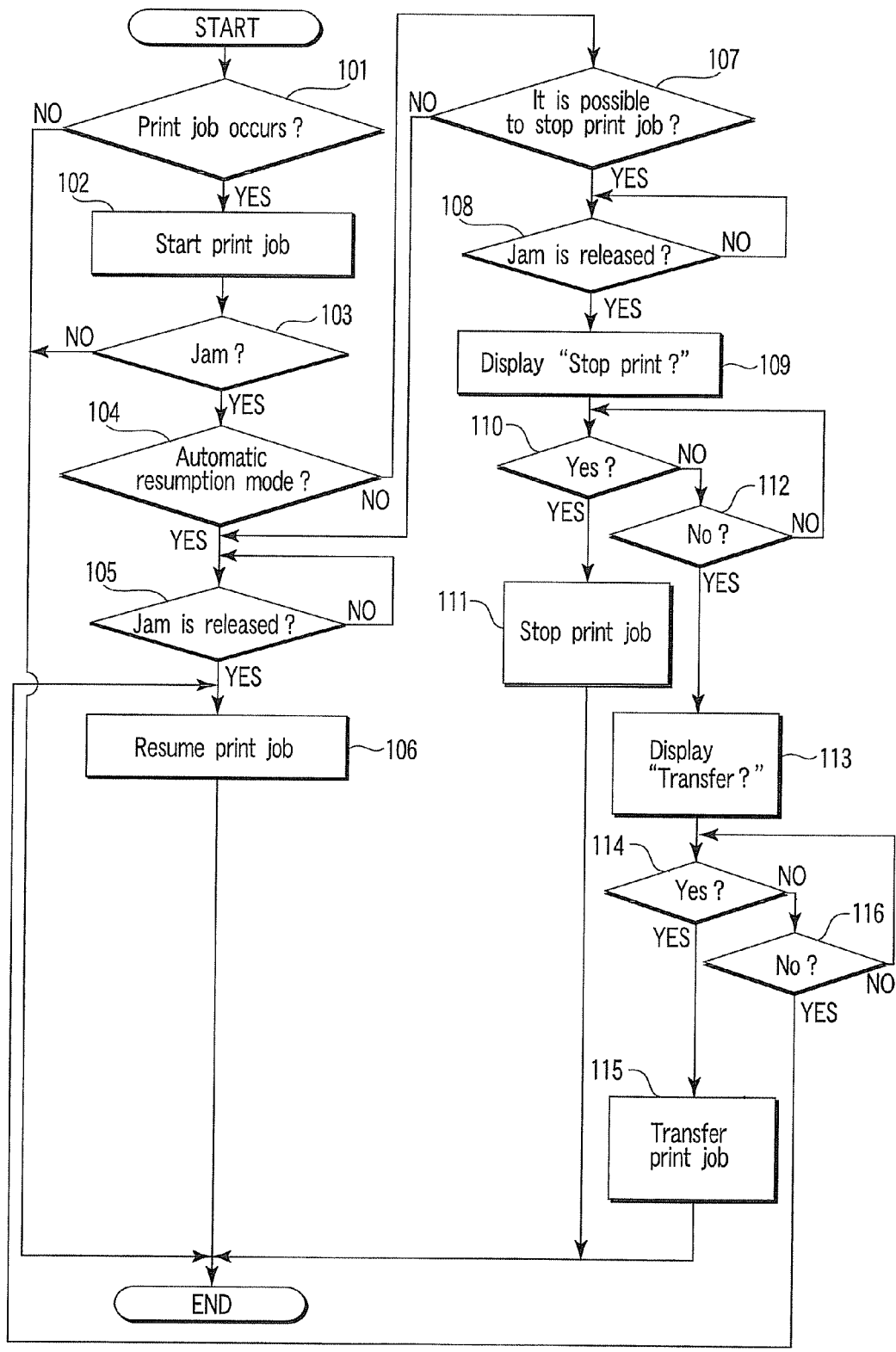
FIG. 5 is a flowchart for explaining actions of the first embodiment.

Actions will be explained with reference to a flowchart in FIG. 5.

When a print job such as copy, network print, or facsimile reception occurs (YES in step 101), the print job is started (step 102).

When the sheet P is jammed after the start of this print job (YES in step 103), it is determined whether the automatic resumption mode for automatically resuming the print job is set (step 104). A user can freely set the automatic resumption mode according to touch operation of a liquid crystal display screen 3g of the control panel 3.

When a determination result in step 104 is affirmative (YES in step 104), i.e., the automatic resumption mode is set, after the jam of the sheet P is released by the user (YES in step 105), the print job is resumed (step 106).

However, when the determination result in step 104 is negative (NO in step 104), i.e., the automatic resumption mode is not set (or a user selection mode is set), it is determined whether it is possible to stop the print job (step 107). It is possible to stop the print jobs such as copy and network print but it is impossible to stop the print jobs such as facsimile reception.

When a determination result in step 107 is negative (NO in step 107), i.e., when it is impossible to stop the print job, after the jam of the sheet P is released by the user (YES in step 105), the print job is resumed (step 106).

When the determination result in step 107 is affirmative (YES in step 107), i.e., when it is possible to stop the print job, after the jam of the sheet P is released by the user (YES in step 108), as shown in FIG. 3, a word "stop print?" is displayed on the liquid crystal display screen 3g of the control panel 3 as an inquiry about whether the print job should be stopped (step 109). A "YES" button for designating that the print is stopped and "NO" button for designating that the print is not stopped are also displayed on this liquid crystal display screen 3g.

When the user touches the "YES" button (YES in step 110), the print job is stopped (step 111). According to this stop, it is possible to prevent a situation in which the other sheets P are repeatedly jammed. Therefore, it is possible to prevent wasteful consumption of the sheets P and the developing agent.

Figure 6:
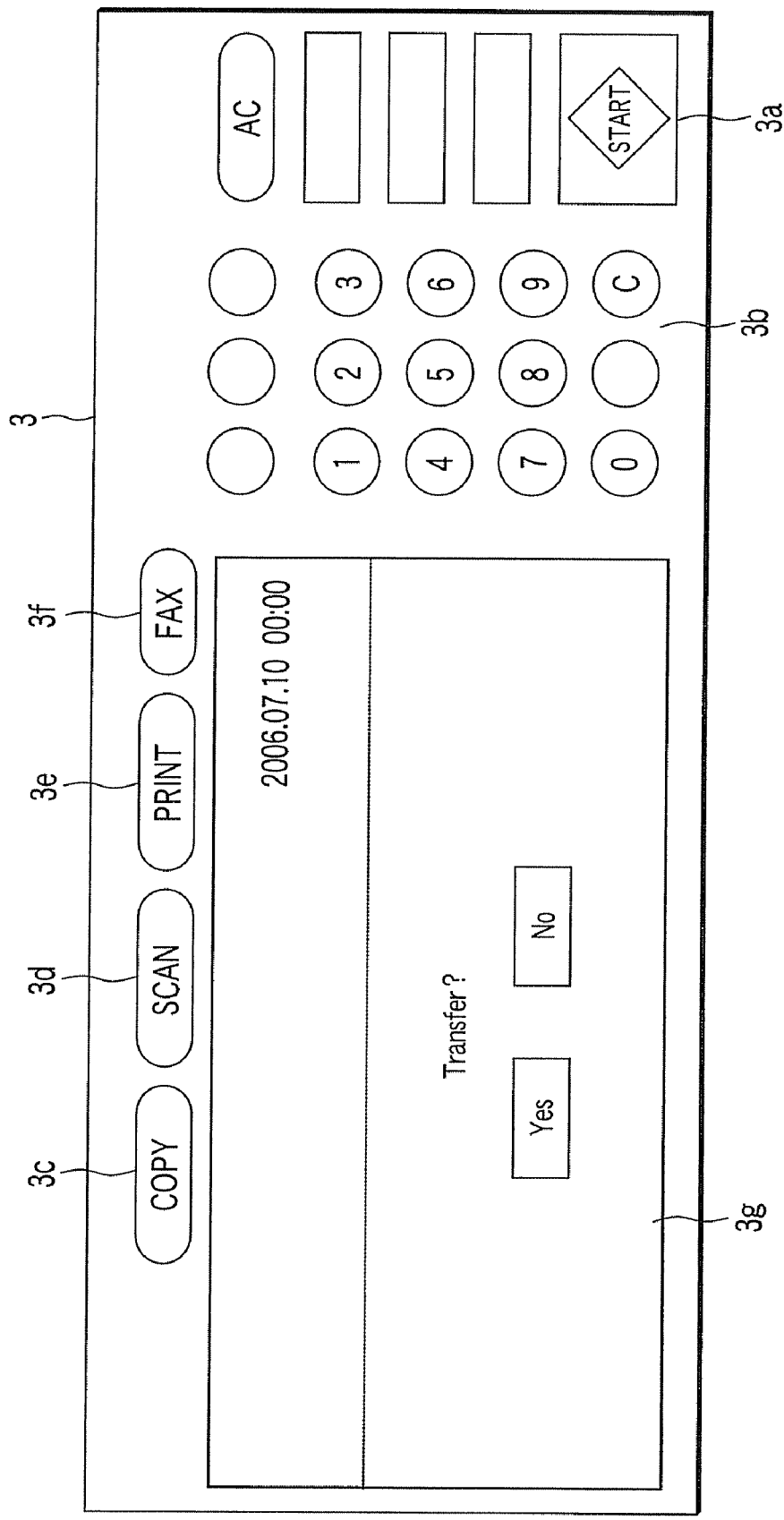
FIG. 6 is a diagram showing another example of the display of the control panel of the embodiment.

When the user touches the "NO" button (NO in step 110 and YES in step 112), as shown in FIG. 6, a word "transfer?" is displayed on the liquid crystal display screen 3g of the control panel 3 as an inquiry about whether the print job should be transferred to the external apparatus (step 113). A "YES" button for designating that the print job is transferred and a "NO" button for designating that the print job is not transferred are also displayed on this liquid crystal display screen 3g.

When the user touches the "YES" button (YES in step 114), the print job is transferred to the external apparatus, for example, another image forming apparatus (step 115). The print job transferred is executed in the image forming apparatus 74.

When the user touches the "NO" button (NO in step 114 and YES in step 116), the print job is resumed (step 106).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
a cassette storing a sheet;
a display;

a printer forming an image on the sheet conveyed from the cassette;

a controller configured to start a print job for forming the image on the sheet, to resume the print job after the jammed sheet is released from the printer if the automatic resumption mode is set, and to stop the print job without the automatic resumption mode after the jammed sheet is released from the printer if a print selection on the display is set to stop the print job.

2. An apparatus according to claim 1, wherein the controller determines whether it is possible to stop the print job if the automatic resumption mode is not set and resumes the print job after the jammed sheet is released from the printer if the print job is not possible to stop.

3. An apparatus according to claim 2, wherein the controller stops the print job after the jammed sheet is released from the printer if the print job is possible to stop.

4. An apparatus according to claim 3, wherein the controller determines whether the print job should be stopped if the print job is possible to stop and stops the print job if the print job should be stopped.

5. An apparatus according to claim 4, wherein the controller determines whether the print job should be transferred to an external apparatus if the print job should not be stopped and transfers the print job to the external apparatus if the print job should be transferred.

6. An apparatus according to claim 5, wherein the controller resumes the print job if the print job should not be transferred.

7. An image forming apparatus comprising:
a cassette storing a sheet;
a display;
a printer forming an image on the sheet conveyed from the cassette;
a unit receiving an user input of whether an automatic resumption mode is set;
a controller configured to start a print job for forming the image on the sheet, to resume the print job after the jammed sheet is released from the printer if the automatic resumption mode is set, and to stop the print job without the automatic resumption mode after the jammed sheet is released from the printer if a print selection on the display is set to stop the print job.

8. An apparatus according to claim 7, wherein the controller determines whether it is possible to stop the print job if the automatic resumption mode is not set and resumes the print job after the jammed sheet is released from the printer if the print job is not possible to stop.

9. An apparatus according to claim 8, wherein the controller stops the print job after the jammed sheet is released from the printer if the print job is possible to stop.

10. An apparatus according to claim 9, wherein the controller determines whether the print job should be stopped if the print job is possible to stop and stops the print job if the print job should be stopped.

11. An apparatus according to claim 10, wherein the controller determines whether the print job should be transferred to an external apparatus if the print job should not be stopped and transfers the print job to the external apparatus if the print job should be transferred.

12. An apparatus according to claim 11, wherein the, controller resumes the print job if the print job should not be transferred.

13. A control method of an image forming apparatus including a cassette storing a sheet, a display, a printer forming an image on the sheet conveyed from the cassette, and a unit receiving an user input of whether an automatic resumption mode is set, the control method comprising:

starting a print job for forming the image on the sheet, resuming the print job after the jammed sheet is released from the printer if the automatic resumption mode is set, and stopping the print job without the automatic resumption mode after the jammed sheet is released from the printer in response to a user setting on the display being set to stop print job.

14. The method of claim 13, further comprising:
determining whether it is possible to stop the print job if the automatic resumption mode is not set, and
resuming the print job after the jammed sheet is released from the printer if the print job is not possible to stop.

15. The method of claim 14, further comprising:
stopping the print job after the jammed sheet is released from the printer if the print job is possible to stop.

16. The method of claim 15, further comprising:
determining whether the print job should be stopped if the print job is possible to stop, and
stopping the print job if the print job should be stopped.

17. The method of claim 16, further comprising:
determining whether the print job should be transferred to an external apparatus if the print job should not be stopped, and
transferring the print job to the external apparatus if the print job should be transferred.

18. The method of claim 17, further comprising:
resuming the print job if the print job should not be transferred.

* * * * *